Figure 1:
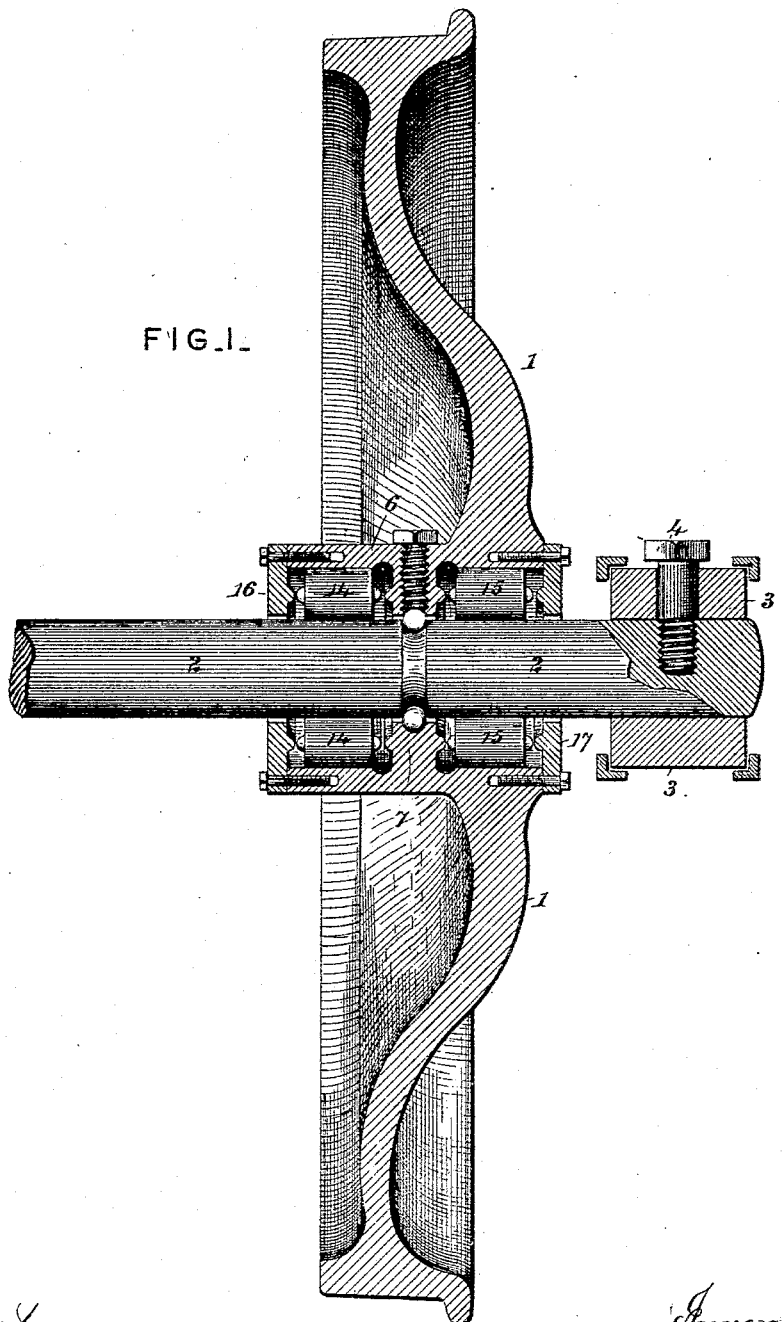

(No Model.) 5 Sheets—Sheet 1.

S. C. MENDENHALL.
ANTI FRICTION BEARING FOR CAR WHEELS.

No. 321,516. Patented July 7, 1885.

Attest.
Geo. T. Smallwood.
Jas. K. McCutchan.

Inventor:
Stephen C. Mendenhall.
By Knight Bros.
Attys.

(No Model.) 5 Sheets—Sheet 2.
S. C. MENDENHALL.
ANTI FRICTION BEARING FOR CAR WHEELS.
No. 321,516. Patented July 7, 1885.
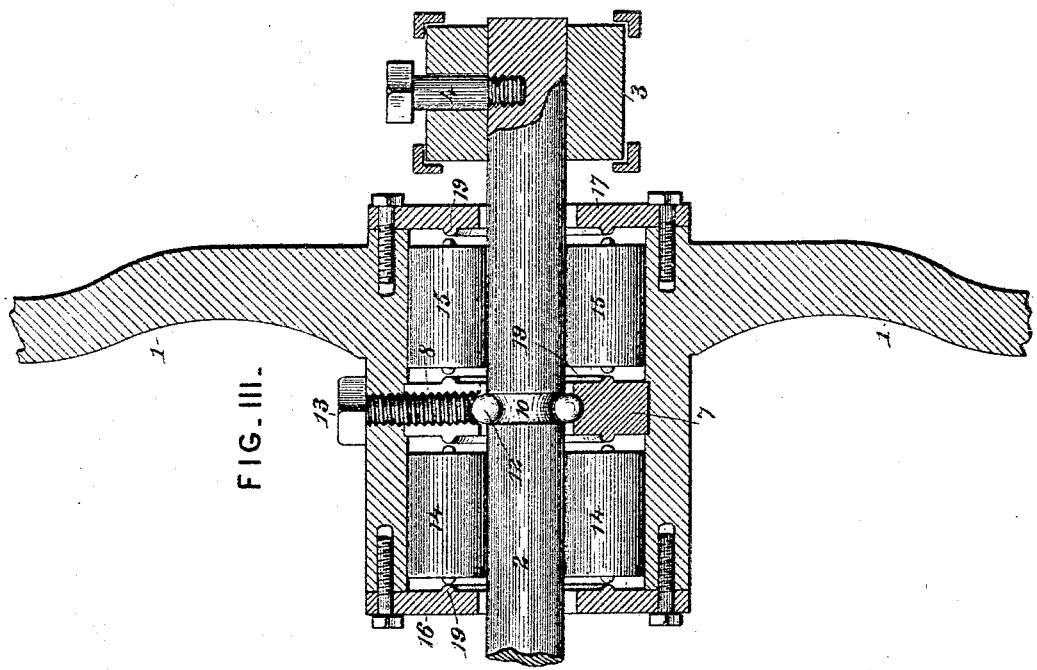
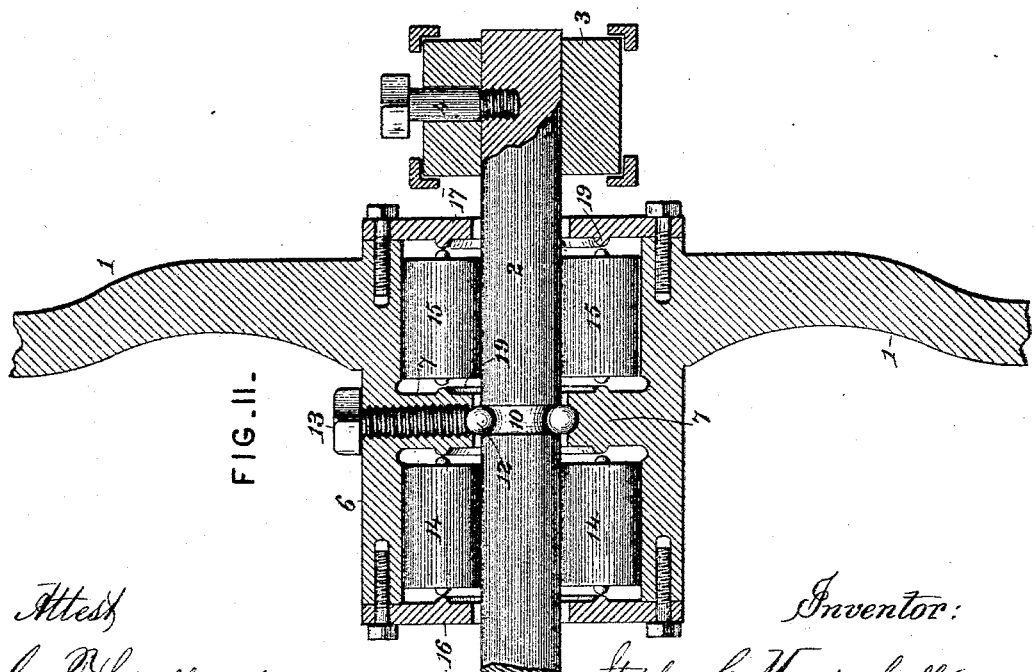
Attest:
Geo. T. Smallwood.
Jas. K. McCathran.
Inventor:
Stephen C. Mendenhall.
by Knight Bros.
attys (No Model.) 5 Sheets—Sheet 3.
S. C. MENDENHALL.
ANTI FRICTION BEARING FOR CAR WHEELS.
No. 321,516. Patented July 7, 1885.
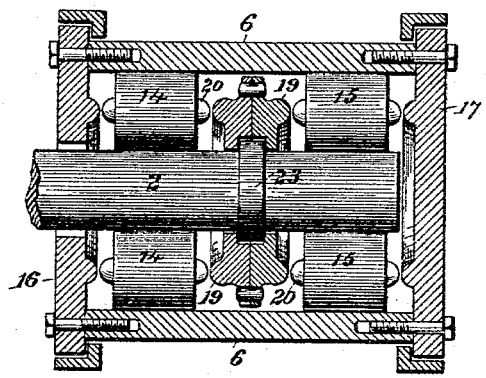
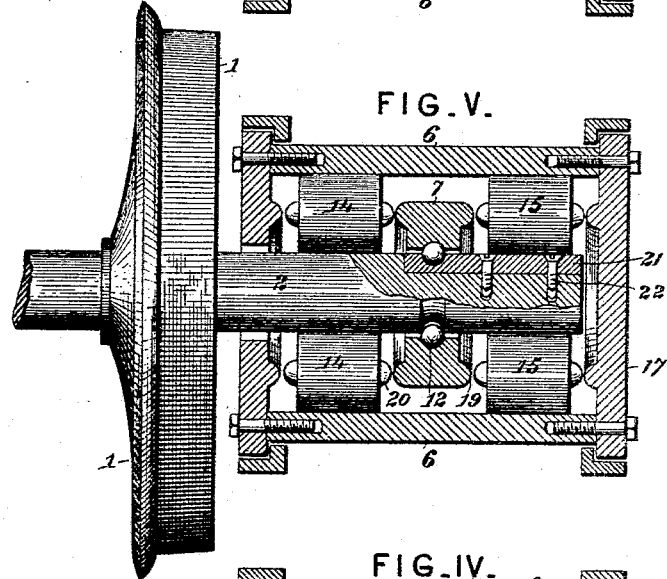
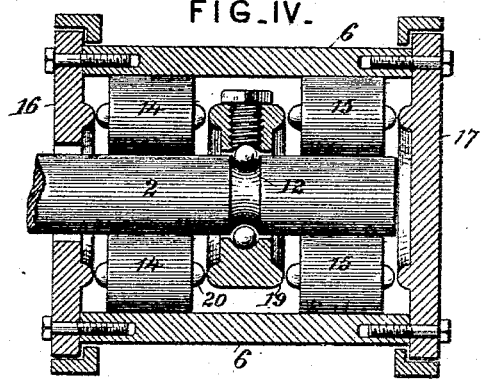
Attest:
Geo. P. Smallwood.
Jas. K. McCathran
Inventor:
Stephen C. Mendenhall.
By Knight Bros.
attys.

(No Model.)   5 Sheets—Sheet 4.
S. C. MENDENHALL.
ANTI FRICTION BEARING FOR CAR WHEELS.
No. 321,516.   Patented July 7, 1885.
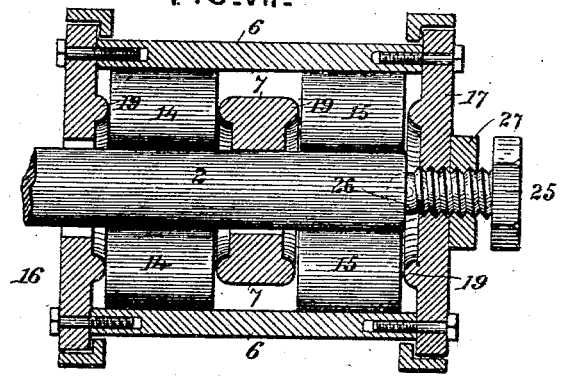
FIG. VII.
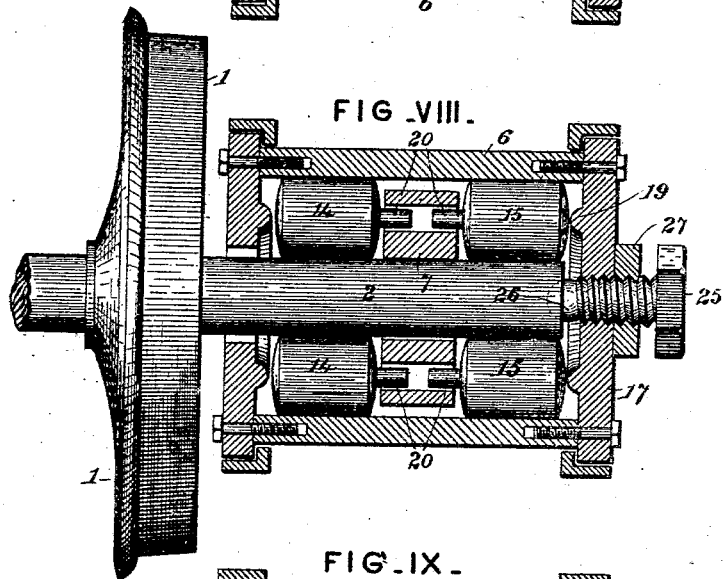
FIG. VIII.
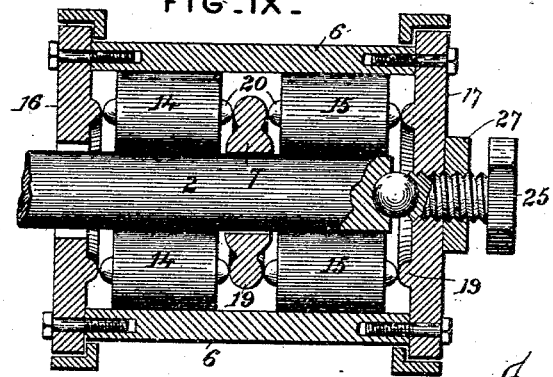
FIG. IX.
Attest:
Geo. T. Smallwood.
Jas. K. McCathran.
Inventor:
Stephen C. Mendenhall
by Knight Bros
atty (No Model.) 5 Sheets—Sheet 5.
S. C. MENDENHALL.
ANTI FRICTION BEARING FOR CAR WHEELS.
No. 321,516. Patented July 7, 1885.
FIG. X.
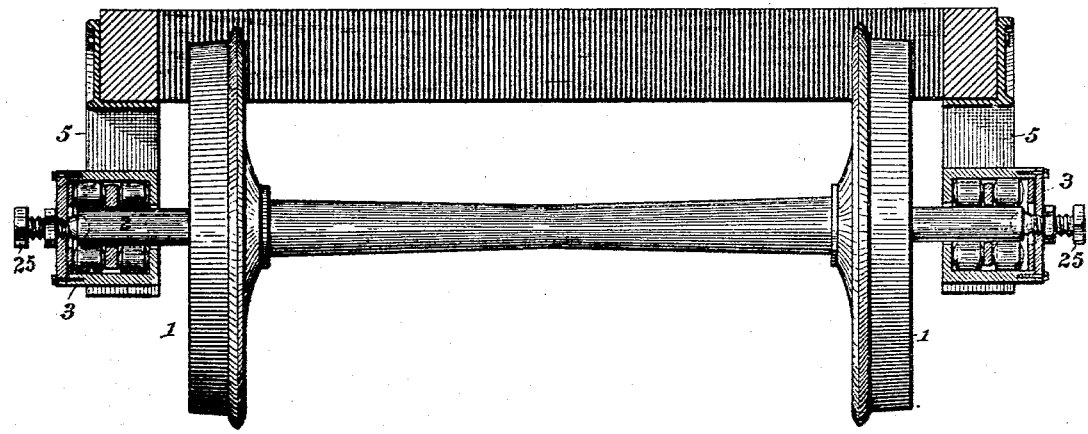
FIG. XI. FIG. XII.
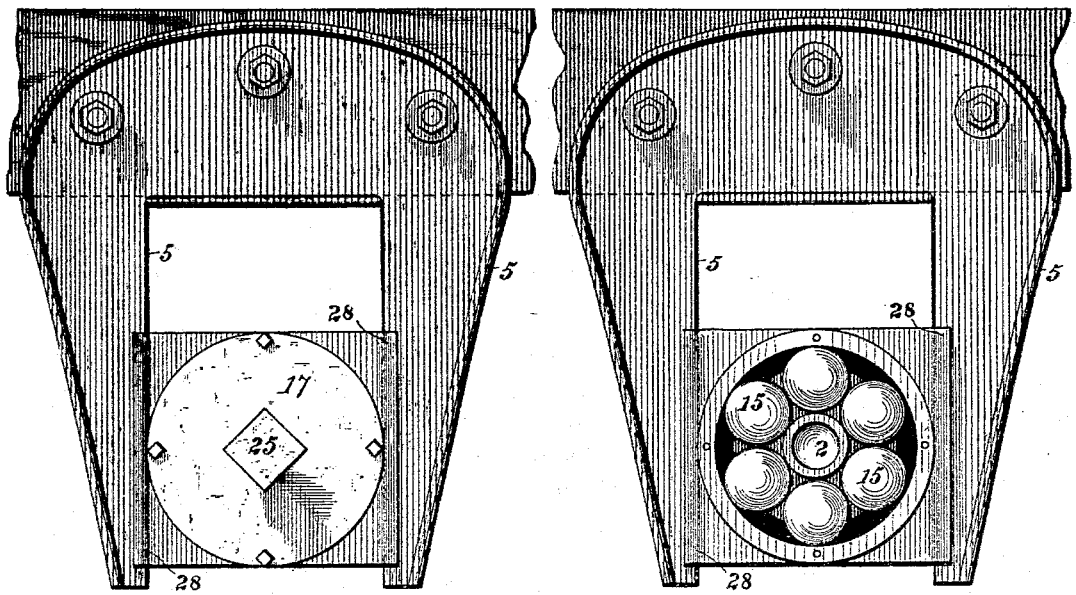
Attest:
Geo. T. Smallwood.
Jas. K. McCathran.
Inventor:
Stephen C. Mendenhall.
By Knight Bros
attys.

UNITED STATES PATENT OFFICE.

STEPHEN C. MENDENHALL, OF RICHMOND, INDIANA.

ANTI-FRICTION BEARING FOR CAR-WHEELS.

SPECIFICATION forming part of Letters Patent No. 321,516, dated July 7, 1885.

Application filed February 26, 1885. (No model.)

*To all whom it may concern:*

Be it known that I, STEPHEN C. MENDENHALL, a citizen of the United States, residing at Richmond, in the county of Wayne and State of Indiana, (present business address Cincinnati, Ohio,) have invented certain new and useful Improvements in Anti-Friction Bearings for Car and other Wheels, of which the following is a specification.

My improvements are intended, primarily, for application to car-wheels, and they consist in the introduction between the journal of the axle and the journal box or casing, of a number of anti-friction-wheels of peculiar form, arranged in two series separated from each other by a ring, which at the same time preferably enables the retention of the wheel to proper position upon the journal. The journal box or casing may be formed or cast upon the car-wheel itself, or be supported on the frame in customary manner. Preferably, the first of these two plans is followed, the axle being fixed to the frame and the wheel adapted to revolve upon the journal and held to proper position thereon by the ring, as just described.

In order that the invention may be better understood, I will proceed to describe it with reference to the accompanying drawings, in which—

Figure I is a vertical sectional view of a car-wheel upon its journal, and having my anti-friction bearing in its preferred form applied thereto. Fig. II is a detail view, of the same form, of the bearing to a larger scale. Fig. III is a view similar to Fig. II, showing a modified form of the butting-ring. Fig. IV illustrates in vertical section the preferred method of application of the anti-friction bearing to a construction in which the journal-box is supported in the frame of the car. Figs. V to IX inclusive, are similar views of modifications of this form of the invention. Fig. X is a vertical sectional view of a truck embodying the form of invention shown in Fig. VII. Fig. XI is a side elevation of one of the boxes thereof. Fig. XII is a similar view with cap plate or cover removed.

1 is a car-wheel, 2 its journal or car-axle, which is rigidly fixed within the block 3 by screw 4, as shown in Fig. I, or which occupies an anti-friction journal-box taking the place of the block 3 and moving vertically in pedestal 5, as described more in detail with reference to Figs. X to XII, inclusive.

In Fig. I the wheel is cast or provided with a coaxial cylindrical box, 6, having an internal butting-ring, 7. This butting-ring is shown in Figs. I and II cast integrally with box 6; but in Fig. III it is shown as made separately from said box, and split at 8, so as to allow it to be compressed when being forced into the box. When in position in the center thereof, it expands into a groove, 9, provided therefor. The ring 7 and journal 2 are each provided with a half-circular groove, 10 11, respectively, adapted to be occupied by a series of balls, 12, which are inserted by a screw-threaded hole through the box 6 and ring 7. When a sufficient number of balls have been dropped into place, a screw, 13, is made to occupy said hole and retain the balls in place. The inner extremity of said screw may for this purpose also be grooved in one direction, so as to form a continuation of the groove 11 in the ring.

In the form shown in Fig. III the screw 13 serves not only to retain the balls in position but to expand and fix the ring 7 within the box, it being made to occupy the split or opening in said ring. 14 15 are two series of anti-friction rollers arranged around the journal within the box 6 on opposite sides of ring 7, and retained within the box by cap-plates 16 17, fastened by bolts or screws 18 to said box. The inner faces of the cap-plates 16 17 and both faces of the ring 7 are provided with annular ridges 19, which serve as bearing for rounded axial projections 20 upon each side of the anti-friction rollers 14 15. This arrangement is such that the impingement of the roller endwise upon the ring or cap-plate is limited, as nearly as possible, to a single point, and the friction thus greatly diminished as compared with a construction in which the full side of the roller would come in contact with the flat surface of the ring or cap-plate.

It will be seen that the result of the above-described construction is that the wheel 1 has perfect liberty of rotation upon the car-axle, the wheel on either end of the axle being capable of movement independently of that on the other end, so as to avoid the great friction present when turning curves with the construction now used in these devices. Should any tendency exist to force the wheel longitudinally upon its journal, the series of balls 12, bearing between the ring 7 and the journal, will arrest such motion while at the same time not materially impeding the rotation of the wheel.

In Figs. IV to X, inclusive, are shown other applications of this improvement in butting-rings and anti-friction rollers, this form of the invention being applicable to cases in which the car-wheel is fixed upon its axle, and the journal of said axle revolves in an anti-friction box supported from the car-truck.

In Fig. IV the ring is made separate from both box and axle, being connected with the latter only by means of grooves and anti-friction balls similar to those already described. It will be seen that in this arrangement any tendency of the journal to longitudinal movement in the box will be taken up by such balls which bear against the ring 7, which in turn bears by anti-friction contacts 19 20 on the rollers 14 or 15. These rollers in their turn have similar anti-friction contact with the cap-plates 16 17 of the journal-box.

In Fig. V the principle of operation is identical with that in Fig. IV, the only change made being in the method of insertion of the balls 12 into their groove. As here shown, the journal is cut away from the bottom of its groove to its outer end and to a width equal to the diameter of the balls 12.

In putting the anti-friction-box together after the cap-plate 16 and casing 6 have been placed on the journal and one series of rolls, 14, arranged therein, as shown, the ring 7 is slipped in, the balls 12 then dropped through the groove or recess in the journal into their groove within the ring, and the said recess in the journal is then closed by key 21, which is fixed in position by screws 22, or any other preferred means.

It is understood that the balls are only used of number to allow the key 21 to be slipped into position after all the balls are in place. The ring 7 may be made to perform the same functions, as shown in these two last cases, by making it in two parts, as shown in Fig. VI, which parts are riveted together either over a series of anti-friction balls similar to those shown in Figs. IV or V, or over a collar, 23, which is shrunk or otherwise fixed to its desired position upon the journal. In this case it will be perceived that the ring 7, while serving the purpose of a butting-ring and preventing the axle from removal from its journal-box, will not have the same effect in preventing friction in case of strain between said ring and means of connection with the journal. If preferred, however, the ring 7 may serve merely to keep the two series of rolls 14 15 apart and present a constant even bearing to their ends or projections 20. The ring in this case is made loose upon the axle-journal, as shown in the subsequent figures of the drawings, its outer edges being made with ridges, 19, as shown in Figs. VII and IX, or with cylindrical openings, 24, within which the projections 20 of the rollers rest, as shown in Fig. VIII.

It will be seen that in the construction shown in Figs. VII and IX the rollers will move independently of the ring 7 around the journal, while in the construction shown in Fig. VIII the ring must accompany them in their revolution. In all these cases the cap-plates 16 17 are provided with ridges 19, which lessen the frictional contact between the anti-friction rollers and said plates.

In the construction shown in these figures it is necessary to provide some means for preventing the endwise movement of the journal in its box. I have provided means for accomplishing this object with as little friction as possible at the end of the journal, while being capable of taking up any wear which may occur. To these ends I provide a set-screw, 25, having a sphero-segmental cavity on its inner end corresponding to a similar cavity on the end of the journal. Between these two cavities is retained a single anti-friction ball, 26. The screw 25 is set up as wear occurs between the parts 2, 25, and 26, and is locked in position by nut 27.

The last sheet of the drawings shows one form of application of the journal-boxes to a car-truck, the casing 6 of the journal-box sliding vertically in the pedestals 5, and being retained from endwise movement therein by flanges 28 on the box itself, or on the cap plates or covers 16 17 thereof.

Having thus described my invention, the following is what I claim as new therein, and desire to secure by Letters Patent—

1. In combination with a car or other axle and its box, a separate butting-ring applied to said axle so as to be prevented from endwise movement thereon, and two series of anti-friction rollers placed around the axle between the said ring and the ends of the box, substantially as set forth, so as to relieve the lateral strain between axle and box.

2. In combination with an axle having groove or way encircling it, a box surrounding said axle, and butting-ring within said box having a groove on its interior face, a series of balls retained between the said ring and axle within the said grooves, and two annular series of anti-friction rollers arranged within the box on opposite sides of said ring, substantially as and for the purpose set forth.

3. In combination with a car or other axle and a wheel revolving loosely thereon having a cylindrical enlargement or box, two series of loose anti-friction rollers, (one at each end of said box,) and a butting-ring fixed or formed on and revolving with the box between the two series of anti-friction rollers, substantially as set forth.

4. In an anti-friction box, the rollers having cylindrical rolling surfaces and rounded axial teats projecting beyond the end surfaces of the rollers, substantially as set forth.

5. In an anti-friction box, in combination with end plates or covers, and butting-ring having raised anti-friction ridges, rollers having axial teats or projections, substantially as set forth.

6. In combination with an axle, its journal-box and two series of anti-friction rollers between the same, a ring separating the said two series of rollers, having annular ridges, on which the ends of said rollers bear for limiting the frictional contact, as set forth.

7. In combination with the car axle and wheel, the latter having cylindrical enlargement or box, and suitable anti-friction rollers between the axle and box, the cap plates or covers having interior annular ridges for receiving the end-thrust of said anti-friction rollers, substantially as and for the purposes set forth.

STEPHEN C. MENDENHALL.

Witnesses:
HARRY E. KNIGHT,
OCTAVIUS KNIGHT.